(12) United States Patent
Jeter

(10) Patent No.: US 10,202,246 B2
(45) Date of Patent: Feb. 12, 2019

(54) PEDESTAL FOR SUPPORTING AN ADHESIVE MELTER AND RELATED SYSTEMS AND METHODS

(71) Applicant: NORDSON CORPORATION, Westlake, OH (US)

(72) Inventor: David R. Jeter, Woodstock, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 15/338,430

(22) Filed: Oct. 30, 2016

(65) Prior Publication Data

US 2017/0043964 A1 Feb. 16, 2017

Related U.S. Application Data

(63) Continuation of application No. 13/796,515, filed on Mar. 12, 2013, now Pat. No. 9,499,355.

(60) Provisional application No. 61/718,856, filed on Oct. 26, 2012.

(51) Int. Cl.
*B65G 53/06* (2006.01)
*B05C 11/10* (2006.01)

(52) U.S. Cl.
CPC .......... *B65G 53/06* (2013.01); *B05C 11/1042* (2013.01)

(58) Field of Classification Search
CPC ............... B65G 53/06; B05C 11/1042; B29K 2105/0097; B67D 7/80
USPC ............. 406/122, 139, 144, 145, 141, 197; 219/421, 433, 436; 414/287, 586; 222/146.2
See application file for complete search history.

(56) References Cited

U.S. PATENT DOCUMENTS

| | | | |
|---|---|---|---|
| 2,774,792 A | 12/1956 | Carlson et al. | |
| 2,955,880 A | 10/1960 | Schlicksupp | |
| 3,030,153 A | 4/1962 | Krenke et al. | |
| 3,186,768 A | 6/1965 | Pendleton et al. | |
| 3,476,570 A | 11/1969 | Moustafa | |
| 3,580,644 A | 5/1971 | Ballard | |
| 4,121,535 A * | 10/1978 | Roberts, Jr. ............... | B05C 9/14 118/410 |
| 4,273,477 A | 6/1981 | Murphy | |
| 4,505,623 A | 3/1985 | Mulder | |
| 4,583,885 A | 4/1986 | Thiele | |
| 4,659,293 A | 4/1987 | Evenson | |

(Continued)

FOREIGN PATENT DOCUMENTS

| | | |
|---|---|---|
| DE | 3543485 A1 | 6/1987 |
| EP | 1044904 A1 | 10/2000 |

(Continued)

OTHER PUBLICATIONS

EP Application No. 13187635: European Search Report dated Mar. 4, 2014.

(Continued)

*Primary Examiner* — Joseph A Dillon, Jr.
(74) *Attorney, Agent, or Firm* — Baker & Hostetler LLP

(57) ABSTRACT

A method of supplying adhesive particulates from a hopper to an adhesive melter is described. Initially, a flow tube is fluidly coupled between the adhesive melter and the hopper. Next, forced air is supplied through the flow tube to move the adhesive particulates from the hopper into the adhesive melter for melting the adhesive particulates into a fluid adhesive.

21 Claims, 5 Drawing Sheets

(56) References Cited

U.S. PATENT DOCUMENTS

| | | |
|---|---|---|
| 4,722,267 A | 2/1988 | Galockin et al. |
| RE32,841 E | 1/1989 | Mulder |
| 4,893,758 A | 1/1990 | Foley et al. |
| 4,919,072 A | 4/1990 | Claasen |
| 5,006,018 A | 4/1991 | Depew |
| 5,006,019 A | 4/1991 | Dziedzic, Jr. et al. |
| 5,148,947 A * | 9/1992 | Epp .................... B05C 11/1042 220/4.03 |
| 5,269,463 A | 12/1993 | Burks |
| 5,378,089 A | 1/1995 | Law |
| 5,382,117 A | 1/1995 | Rings et al. |
| 5,406,777 A | 4/1995 | Porto |
| 5,518,344 A | 5/1996 | Miller et al. |
| 5,690,450 A | 11/1997 | Miller et al. |
| 5,791,830 A | 8/1998 | Fort et al. |
| 5,909,829 A | 6/1999 | Wegman et al. |
| 5,971,207 A | 10/1999 | McDonough et al. |
| 6,039,217 A * | 3/2000 | Faulkner, III ....... B05C 11/1042 222/146.5 |
| 6,039,513 A | 3/2000 | Law |
| 6,056,483 A | 5/2000 | Nakamura et al. |
| 6,095,803 A | 8/2000 | Slater |
| 6,352,173 B1 | 3/2002 | Duckworth |
| 6,398,462 B1 | 6/2002 | Fulkerson |
| 6,740,851 B2 | 5/2004 | Woodlief et al. |
| 7,441,568 B2 * | 10/2008 | Porter .................... B05C 5/001 141/11 |
| 7,490,735 B2 | 2/2009 | Raines et al. |
| 7,626,143 B2 | 12/2009 | Miller |
| 7,871,090 B2 | 1/2011 | Staub |
| 8,240,494 B1 | 8/2012 | Mohns |
| 8,307,861 B2 | 11/2012 | Jordan et al. |
| 8,383,991 B2 | 2/2013 | Ganzer et al. |
| 8,529,160 B2 | 9/2013 | Ambriz |
| 8,985,391 B2 | 3/2015 | Ross et al. |
| 9,156,053 B2 | 10/2015 | Tix et al. |
| 9,266,681 B2 | 2/2016 | Chau et al. |
| 9,302,857 B2 | 4/2016 | Clark |
| 2001/0009752 A1 | 7/2001 | Reifenberger et al. |
| 2005/0092736 A1* | 5/2005 | Raterman ............. B05B 7/1693 219/508 |
| 2005/0093403 A1 | 5/2005 | Raterman et al. |
| 2005/0264141 A1 | 12/2005 | Whitall |
| 2005/0274740 A1 | 12/2005 | Duckworth et al. |
| 2007/0080157 A1 | 4/2007 | Mehaffy et al. |
| 2008/0276862 A1* | 11/2008 | Fung .................... B05C 11/1042 118/325 |
| 2009/0095730 A1 | 4/2009 | Ganzer et al. |
| 2010/0017021 A1* | 1/2010 | Wietgrefe ............. B65D 88/30 700/232 |
| 2012/0177451 A1 | 7/2012 | Kvalheim |
| 2012/0312838 A1 | 12/2012 | Clark et al. |
| 2013/0105526 A1 | 5/2013 | Ross et al. |
| 2014/0116569 A1* | 5/2014 | Clark .................... B05C 11/101 141/1 |
| 2014/0377451 A1* | 12/2014 | Kim .................... H01M 4/0419 427/58 |
| 2015/0152292 A1* | 6/2015 | Chartrel .................... B05B 1/24 427/207.1 |
| 2015/0307271 A1* | 10/2015 | Rey ....................... B05B 7/1445 414/304 |
| 2016/0101611 A1* | 4/2016 | Chau .................... B05C 11/1002 156/578 |
| 2016/0236231 A1* | 8/2016 | Chastine ............. B65G 11/106 |
| 2016/0332186 A1* | 11/2016 | Richards ............. B05C 11/1007 |

FOREIGN PATENT DOCUMENTS

| | | |
|---|---|---|
| EP | 1153668 A2 | 11/2001 |
| EP | 1350743 A1 | 10/2003 |
| FR | 2787770 A1 | 6/2000 |
| JP | 59177154 A | 10/1984 |

OTHER PUBLICATIONS

EP Application No. 14183120: European Search Report dated Apr. 30, 2015.

Nordson Corporation, Fillmaster™ Adhesive Feed System, PKL-02-2833, Sep. 2002, 2 pgs.

National Starch & Chemical, Installation, Operation & Maintenance Manual 30 Melt Tank Loader, 30 Vacuum Feed System Unit—Loan Terms, Version 1.3, undated, 22 pgs.

WBH Technologies e.K, Einbauhinweise Fordersystem Slimline auf Nordson 3100, undated, 2 pgs.

WBH Technologies e.K., Operating Manual Conveyor System Slimline, Jul. 2009, 8 pgs.

Nordson Corporation, Pneumatic Fill System Instruction Sheet, Publication No. 108 805A, 1994, 27 pgs.

Nordson Corporation, Adhesives and Sealants Equipment Guide, Vacuum Feed System, Publication No. 237 481C, 2001, 12 pgs.

Nordson Corporation, 1994 Adhesives and Sealants Equipment Catalog, Nordson Automatic Hopper/Feeder, 1994, 5 pgs.

Nordson Corporation, 1994 Adhesives and Sealants Equipment Catalog, Nordson Meltex XP Extruder, 1994, 4 pgs.

Nordson Corporation, 1996 Adhesives and Sealants Equipment Catalog, Nordson Vacuum Feed System, 1996, 7 pgs.

Melton SE, B42 Series Systems PUR Adhesive Melters 42L, Brochure, Rev.sub.—0070307.

Chinese Application No. 201310512068.3: First Office Action dated Oct. 9, 2016, 9 pages.

* cited by examiner

PEDESTAL FOR SUPPORTING AN ADHESIVE MELTER AND RELATED SYSTEMS AND METHODS

CROSS-REFERENCE TO RELATED APPLICATION

This application is a continuation of U.S. patent application Ser. No. 13/796,515, filed Mar. 12, 2013 and published as U.S. Patent App. Pub. No. 2014/0119842 on May 1,2014, which claims the priority of U.S. Provisional Patent App. No. 61/718,856, filed Oct. 26, 2012, the disclosure of which are hereby incorporated by reference herein.

TECHNICAL FIELD

The present invention relates generally to an adhesive melting system and, more particularly, to a pedestal supporting an adhesive melter in an industrial environment.

BACKGROUND

Thermoplastic adhesives, otherwise known as "hot melt" adhesives, have been widely used in the industry for various applications. For example, thermoplastic hot melt adhesives are used for carton sealing, case sealing, tray forming, pallet stabilization, nonwoven application including diaper manufacturing, and many other applications. Hot melt adhesive, in its pre-melted state (referred to herein as "particulate" hot melt adhesive), can be provided in a variety of particulate shapes and sizes, ranging from small bb-sized pieces, to larger sized pieces including pellets and chips. Adhesive material, in the form of adhesive particulates, may be supplied to the adhesive melter where it is heated and melted to a desired temperature for dispensing. Hot melt adhesives are often dispensed by systems including a dispensing gun coupled via heated hoses to an adhesive melter. During use, many adhesive melters are subjected to relatively harsh industrial environments. For example, adhesive melters left to operate on a factory floor may be prone to damage from dust, dirt, debris, water, chemicals, or any other foreign matter. Furthermore, using the adhesive melter from the factory floor creates additional difficulty for routing hoses, interacting with a control panel, and filling adhesive particulate into the adhesive melter. As such, adhesive melters are commonly positioned above the floor on a pedestal, stand, or similar structure.

From atop the pedestal, the adhesive melter receives adhesive materials for melting. Adhesive materials are commonly stored in a hopper, bin, or similar container resting on the factory floor to the side of the pedestal. Typically, with respect to auto-feed systems, the adhesive particulates are delivered to the adhesive melter through a hose connected between the hopper and the adhesive melter. The system generates a pressurized airflow, such as with a venturi pump connected to the hose, for suctioning the adhesive particulates from the bin, through the hose, and into the adhesive melter. Of course, the hopper is also subject to the same harsh industrial environment threatening the adhesive melter, but is typically kept on the factory floor to facilitate refilling the hopper with adhesive pellets. Unfortunately, placing both the hopper and the pedestal on the factory floor reduces the amount of usable floor space within the industrial environment. In addition, less floor space for a larger system increases the risk of damage to the hopper and/or the adhesive melter due to harmful foreign matter within the industrial environment.

There is a need for an adhesive melting system and method for use in the hot melt industry that addresses present challenges and issues such as those discussed above.

SUMMARY

One exemplary embodiment is directed to a pedestal for an adhesive melter adapted for melting adhesive particulates into fluid adhesive. The pedestal may include a support structure, a hopper, and a flow tube. The support structure has an upper portion adapted to support the adhesive melter. The hopper is connected to the support structure and positioned generally below the upper portion. Furthermore, the hopper has an opening adapted for receiving adhesive particulates for storage within the hopper. The flow tube has a first end portion and a second end portion. The first end portion is connected to the support structure and fluidly connected to the hopper. The second end portion is adapted for being fluidly connected to the adhesive melter. The flow tube is configured for moving the adhesive particulates from within the hopper to the adhesive melter via forced air moving through the flow tube.

Another exemplary embodiment is directed to an adhesive melting system for melting adhesive particulates into fluid adhesive. The adhesive melting system may include an adhesive melter, a support structure, a hopper, and a flow tube. The support structure has an upper portion supporting the adhesive melter. The hopper is connected to the support structure and positioned generally below the upper portion. Furthermore, the hopper has an opening adapted for receiving adhesive particulates for storage within the hopper. The flow tube has a first end portion and a second end portion. The first end portion is connected to the support structure and fluidly connected to the hopper. The second end portion is connected to the adhesive melter. The flow tube is configured for moving the adhesive particulates from within the hopper to the adhesive melter via forced air moving through the flow tube.

In use, the adhesive particulates are supplied from a hopper to an adhesive melter by supporting the adhesive melter generally above the hopper. A flow tube is fluidly coupled between the adhesive melter and the hopper. Forced air is supplied through the flow tube in order to move the adhesive particulates from within the hopper into the adhesive melter. Thus, the adhesive particulates may be melted into a fluid adhesive.

Various additional objectives, advantages, and features of the invention will be appreciated from a review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below serve to explain the invention.

DETAILED DESCRIPTION

Figure 1:
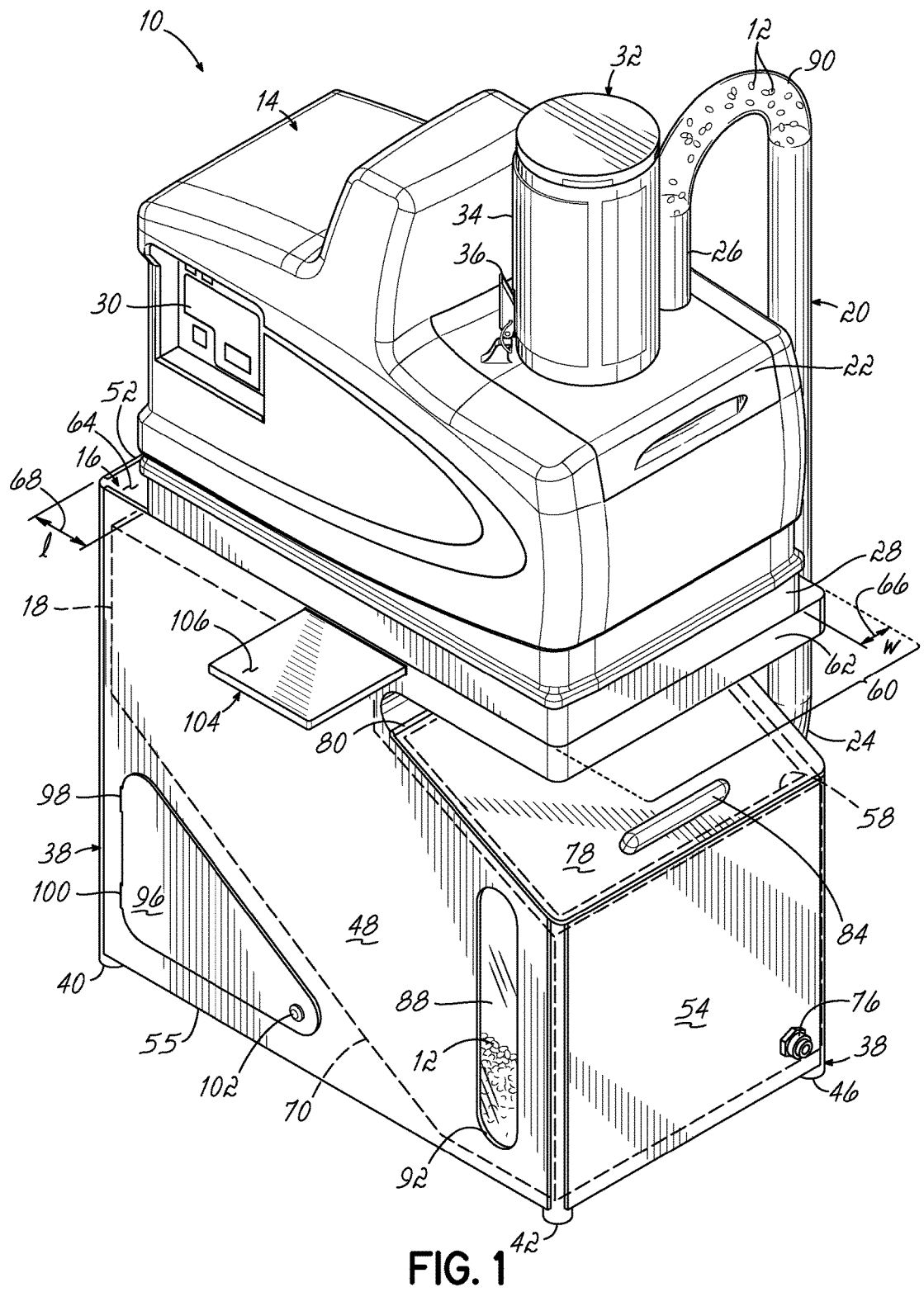
FIG. 1 is a perspective view of one embodiment of a dispensing system.

With reference to FIG. 1, one embodiment of an adhesive melting system 10 for melting adhesive particulates, such as pellets and chips into fluid adhesive includes an adhesive melter 14 and a pedestal 16 adapted to support the adhesive melter 14. According to the exemplary embodiment, the adhesive particulates are adhesive pellets 12. As used herein, the term "adhesive pellets" is not intended to be limiting as to any specific shape or size, so long as the adhesive pellets are suitable to be carried by a stream of forced air such as a vacuum-driven stream. For example, and without limitation, adhesive pellets may have regular shapes, irregular shapes, or any combination thereof. Moreover, any two pellets may have distinct shapes and/or dimensions and still be jointly and generally referred to as "adhesive pellets."

The pedestal 16 also includes a hopper 18, shown in hidden lines, containing the adhesive pellets 12 and a flow tube 20 connected between the adhesive melter 14 and the hopper 18. The flow tube 20 is in fluid communication with both the hopper 18 and the adhesive melter 14 for moving the adhesive pellets 12 from the hopper 18 to the adhesive melter 14. More particularly, the adhesive melting system 10 creates a vacuum that draws the adhesive pellets 12 from within the hopper 18 and dispenses the adhesive pellets 12 within the adhesive melter 14. However, any pressure differential may be used with the air, or any other desirable gas, within the adhesive melting system 10, to create a suction force or blowing force to move adhesive pellets 12 through the flow tube 20. The flow tube 20 may be generally flexible, generally rigid, or formed from any combination thereof, so long as the flow tube 20 has a conduit (not shown) extending therethrough for fluidly connecting the hopper 18 to the adhesive melter 14.

The adhesive melter 14 includes a tank not shown in the figures described herein. The tank is suitable to hold a desired amount of adhesive and includes a lid 22 for generally sealing the tank while closed. The lid 22 is coupled to the adhesive melter 14 and provides access to the adhesive held in the tank of the adhesive melter 14. In that respect, the flow tube 20 includes a first end portion 24 and a second end portion 26. The first end portion 24 is fluidly connected to the hopper 18 while the second end portion 26 is connected to the lid 22 for fluid communication with the tank. The adhesive melter 14 also includes a melter base 28 sized to accommodate the tank. The exemplary embodiment of the adhesive melter 14 includes a generally four liter tank with the melter base 28 being sized accordingly. However, a variety of adhesive melter sizes, such as seven liters or ten liters, may also be used.

The adhesive melter 14 further includes a main control panel 30 and an exhaust conduit 32. The main control panel 30 is operative to power the adhesive melter 14 on and off. While the adhesive melter 14 is powered on, forced air moves the adhesive pellets 12 from the hopper 18, through the flow tube 20, and into the tank of the adhesive melter 14 to be melted for any desirable application. Because the forced air carries the adhesive pellets 12 into the tank of the adhesive melter 14, forced air is also expelled from the tank via the exhaust conduit 32 connected to the lid 22. The exhaust conduit 32 generally includes a filter that is not shown in the figures, a filter housing 34 containing the filter, and a clamp 36 connected to the filter housing 34. The filter housing 34 is removably attached to the lid 22 via the clamp 36 and protects the filter contained therein. However, in the event that the filter becomes dirty or damaged, the clamp 36 may be decoupled from the lid 22 to facilitate removing the filter housing 34 from the lid 22 and replacing the filter.

Figure 2:
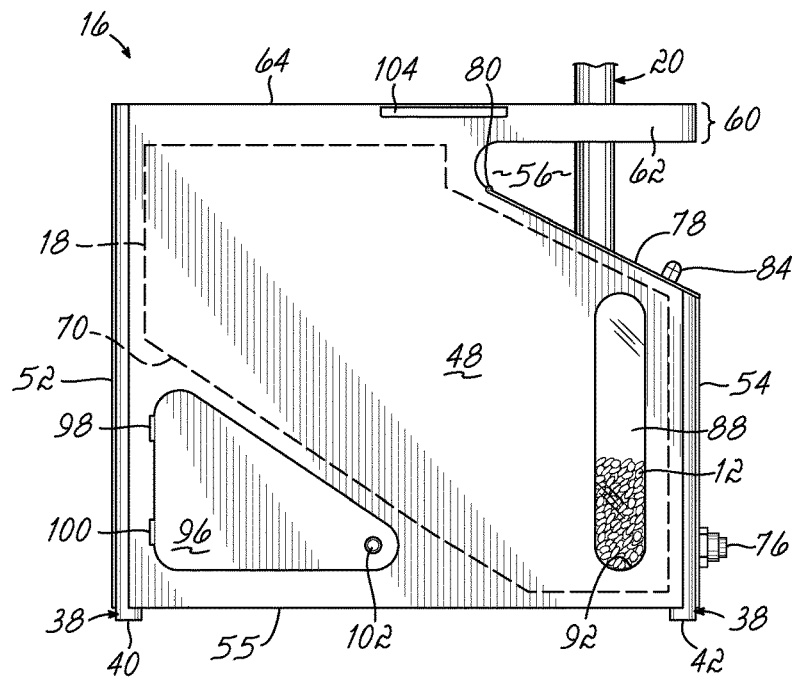
FIG. 2 is a front view of a pedestal according to the embodiment shown in FIG. 1.
Figure 3:
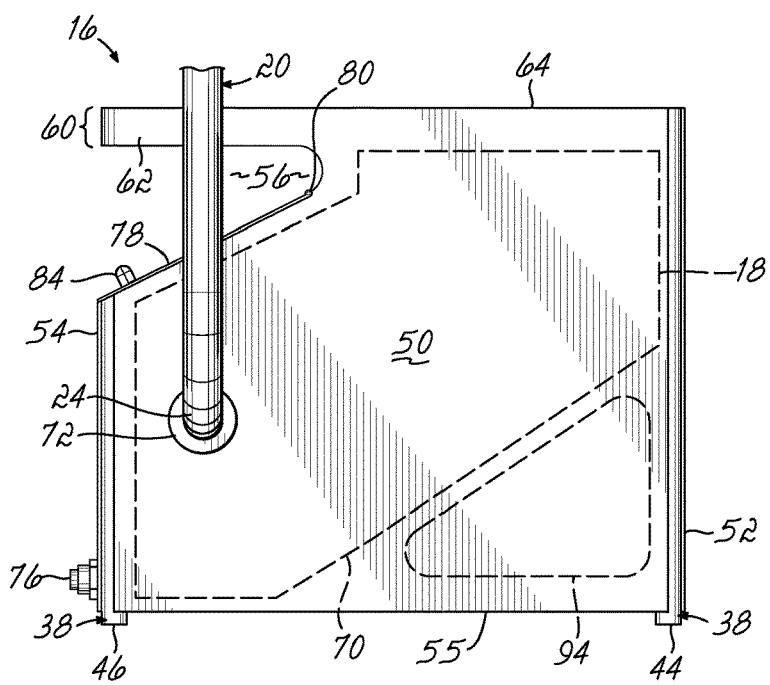
FIG. 3 is a rear view of the pedestal according to the embodiment shown in FIG. 1.

With respect to FIGS. 1, 2, and 3, the pedestal 16 includes a support structure 38 that generally supports the adhesive melter 14, the flow tube 20, and the hopper 18. More particularly, the support structure 38 includes first and second front frames 40, 42 and first and second rear frames 44, 46. The support structure 38 also includes a front panel 48 connected to and extending between the first and second front frames 40, 42 and, similarly, a rear panel 50 connected to and extending between the first and second rear frames 44, 46. Furthermore, a side panel 52 extends between the first front frame 40 and the first rear frame 44, and a lower panel 54 extends between the second front frame 42 and the second rear frame 46. A bottom panel 55 is connected to each of the first and second front frames 40, 42 and extends to the first and second rear frames 44, 46.

The support structure 38 includes a void 56 that extends through the pedestal 16 from the front panel 48 to the rear panel 50. Thus, the void 56 in conjunction with the front panel 48, the rear panel 50, and the lower panel 54, collectively define an opening 58 that extends into the hopper 18. An upper portion 60 of the support structure 38 is adapted to support the adhesive melter 14. Accordingly, the upper portion 60 includes a ledge portion 62 that extends above and offset from the opening 58. A top surface 64 extends across the upper portion 60. The melter base 28 rests directly on the top surface 64. According to the exemplary embodiment of the adhesive melter 14, a remaining width 66 and a remaining length 68 of the top surface 64 extend outward from the melter base 28. The remaining width and length 66, 68 are adapted to support larger, alternative adhesive melters, such as the seven or ten liter adhesive melters. For example, the top surface 64 is sized to accommodate Nordson® ProBlue® Adhesive Melters available in the four, seven, and ten liter tank configurations.

Figure 4:
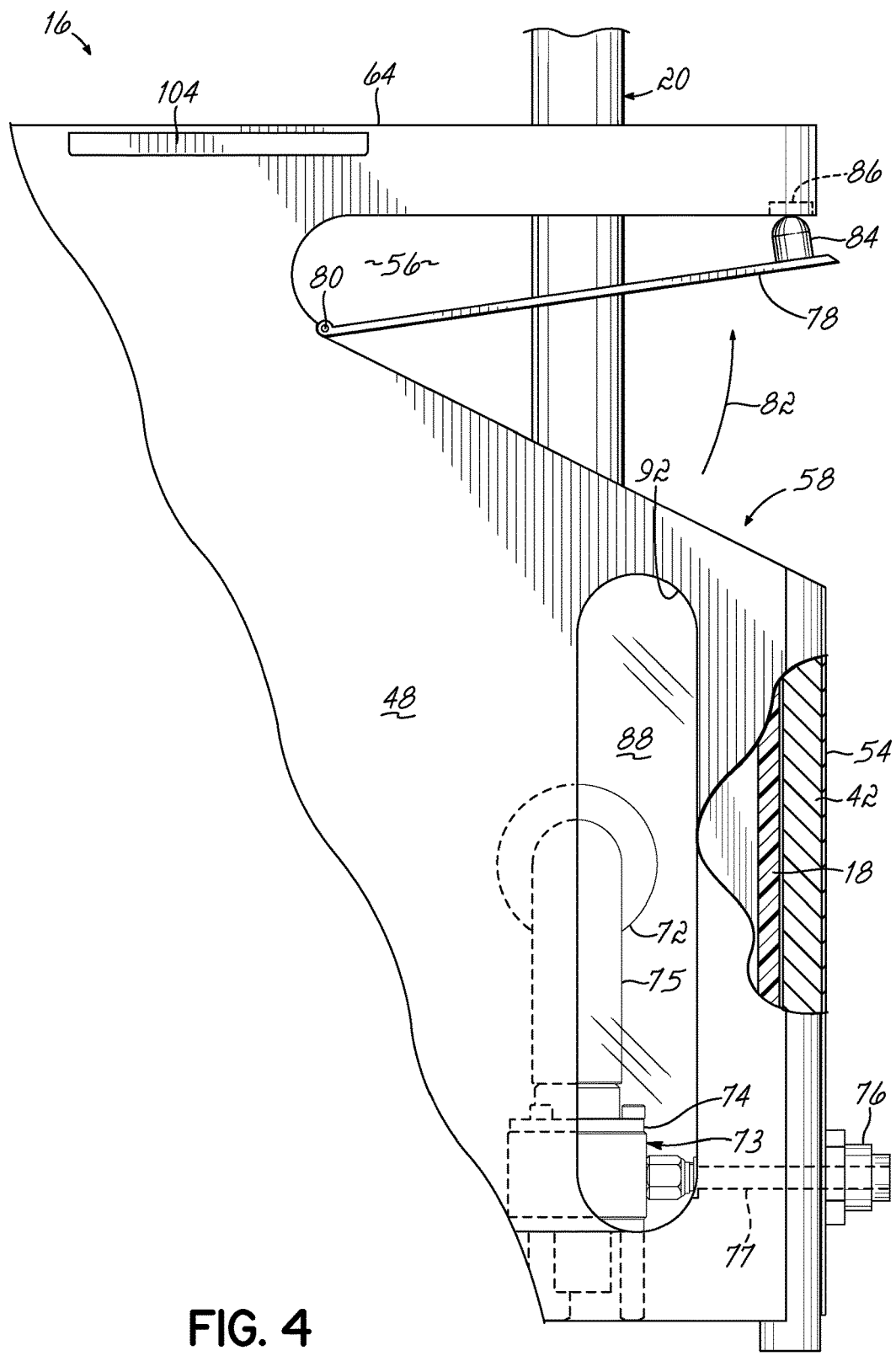
FIG. 4 is a fragmented front view of the pedestal shown in FIG. 2 to better illustrate a cover and a hopper of the pedestal.

The hopper 18 is connected to the support structure 38 interior of the front, rear, side, and lower panels 48, 50, 52, 54. According to the exemplary embodiment, the hopper 18 is connected to and supported by the support structure 38 to which the hopper 18 is connected, as shown in FIG. 4. The hopper 18 may be formed from rotationally molded plastic, or any other material for containing the adhesive pellets 12 in accordance with the principles of the invention described herein. Accordingly, the hopper 18 may be any appropriate shape and/or size for receiving and containing adhesive pellets 12. The opening 58 extends into the hopper 18 for filling and refilling the hopper 18 with adhesive pellets 12 as necessary for use. As shown in FIGS. 1, 2, and 3, the hopper 18 also includes an inclined bottom portion 70 for directing the adhesive pellets 12 generally toward the first end portion 24 of the flow tube 20. Thereby, as the adhesive pellets 12 are removed from the hopper 18, the remaining adhesive pellets 12 fall under the influence of gravity toward the first end portion 24 to facilitate effective removal of the remaining adhesive pellets 12.

As described above, the flow tube 20 is connected to both the pedestal 16 and the adhesive melter 14. With respect to the pedestal 16, the first end portion 24 is connected to the rear panel 50 via a grommet 72. The grommet 72 is connected between the rear panel 50 and the flow tube 20 for sealing the first end portion 24 to the rear panel 50 and damping excessive vibration therebetween. More particularly, the grommet 72 may be made from any material, such as rubber or the like, adapted to damp vibration of the flow tube 20 and the rear panel 50 for preventing failure of the connection therebetween.

With respect to FIG. 4, forced air is provided to a suction wand 73, positioned within the hopper 18 for generating the vacuum for moving the adhesive pellets 12 from the hopper 18. The suction wand 73 is connected through the grommet 72 and positioned within the hopper 18. The suction wand 73 may also include a vibrator (not shown) to loosen the adhesive pellets 12 from each other and aid in the movement thereof. Thus, the grommet 72 effectively damps the vibration from the suction wand 73 from the remainder of the pedestal 16. In order to move the adhesive pellets 12, pressurized air is supplied to a venturi pump (not shown) contained within a pump portion 74 of the suction wand 73. Within the hopper 18, a pipe portion 75 of the suction wand 73 is fluidly connected to the first end portion 24 of the flow tube 20 for suctioning the adhesive pellets 12 out of the hopper 18. The adhesive pellets 12 are then pumped, or otherwise moved, through the flow tube 20 and into the adhesive melter via the pressurized air created by the suction wand 73.

In order to deliver forced air to the suction wand 73, an air line fitting 76 is connected to the lower panel 54. The air line fitting 76 is in fluid communication with the suction wand 73 via a coupling 77 that is connected to the suction wand 73. However, it will be appreciated that any mechanical structure for providing forced air to the hopper 18 and/or the adhesive melter 14 may be used in accordance with known principles for moving adhesive pellets 12. For example, such principles include those in U.S. Provisional Patent Application Ser. No. 60/979,676, the disclosure of which is incorporated herein by reference in its entirety.

The pedestal 16 is also configured to inhibit dust, dirt, debris, water, chemicals, or any other foreign matter, from entering the hopper 18 and contaminating the adhesive pellets 12 contained therein. The ledge portion 62 generally extends over and above the opening 58. Thus, if any foreign matter is directed toward the opening 58 from above, such as falling water, the foreign matter will be deflected by the ledge portion 62 away from the opening 58. In the alternative, the opening may be positioned in a generally vertical orientation to inhibit foreign matter from entering the opening 58 from above. For instance, the void 56 may be removed from the pedestal 16 so that the front panel 48, rear panel 50, and the lower panel 54 extend upward along the entirety of the upper portion 60. Because the void 56 is removed, the ledge portion 62 is also removed. As such, the pedestal 16 would be generally in the form of a rectangular prism, or box, with the hopper 18 contained therein. The opening 58 may be positioned through any one of the vertically positioned front, rear, side, or lower panels 48, 50, 52, 54 to extend into the hopper 18 adjacent to the upper portion 60.

Similarly, the hopper 18 also includes a cover 78 to inhibit foreign matter from entering the opening 58. The cover 78 is connected to the support structure 38 via a hinge 80 adjacent to the opening 58. The cover 78 pivots about the hinge 80 between a closed position and an open position within the void 56 as indicated by arrow 82 in FIG. 4. While in the closed position, the cover 78 generally closes the opening 58. However, in the open position shown in FIG. 4, the cover 78 swings up and away to reveal the opening 58 for gaining access to the hopper 18. A handle 84 connected to the cover 78 further facilitates the gripping and lifting of the cover 78 into the open position. Of course, the ledge portion 62 prevents the cover 78 from pivoting far enough to remain in the open position without holding the cover 78. Thus, a holder 86 is connected to the ledge portion 62 and adapted to hold the cover 78 in the open position. More particularly, the holder 86 is a magnet positioned to contact the handle 84, which is metallic, for holding the cover 78. However, it will be appreciated that any other mechanical structure may be similarly used for holding the cover 78.

Returning to FIGS. 1, 2, and 3, both the hopper 18 and flow tube 20 respectively include a generally transparent window 88 and a generally transparent portion 90 for viewing the adhesive pellets 12 contained therein. The front panel 48 includes a slot 92 aligned with at least a portion of the generally transparent window 88. Accordingly, the generally transparent window 88 extends vertically along the hopper 18 for viewing the level of the adhesive pellets 12 contained therein. This level provides a visual indicator of the amount of adhesive pellets 12 remaining in the hopper 18. In the event that the level of adhesive pellets 12 appears low, the adhesive pellets 12 may be appropriately refilled. Similarly, the generally transparent portion 90 of the flow tube 20 provides a visual indicator of the movement of the adhesive pellets 12 through the flow tube 20. Thus, the flow of adhesive pellets 12 may be seen through the generally transparent portion 90 for troubleshooting or general maintenance of the adhesive melting system 10.

The support structure 38 also defines a storage compartment 94 for storing miscellaneous items related to the adhesive melting system 10. For instance, the storage compartment 94 may be sized for storing one or more replaceable parts, such as filters for use with the exhaust conduit 32 as described above. The storage compartment 94 is positioned generally adjacent to and below the inclined bottom portion 70. The storage compartment 94 includes a compartment door 96 connected to the front panel 48 via first and second hinges 98, 100. The compartment door 96 also includes a latch 102 that engages the front panel 48 for holding the compartment door 96 against the front panel 48 to close the storage compartment 94. Of course, operating the latch 102 will open the door to reveal the storage compartment 94 for placing miscellaneous items inside the storage compartment 94 or removing miscellaneous items therefrom.

Various types of adhesive may be used in the form of adhesive pellets 12 with the adhesive melting system 10. In the event that a first type of adhesive pellet 12 is exchanged for a second type of adhesive pellet 12, the adhesive melter 14 may need to be drained of the first type of melted adhesive to prevent contaminating the second type of adhesive. The first type of melted adhesive may be drained into a pan (not shown), or similar container, for collecting the first type of adhesive. Accordingly, a shelf 104 is connected to the support structure 38 for providing a generally planar surface 106 on which to place the pan (not shown) for collecting adhesive drained from the adhesive melter 14. More particularly, the shelf 104 slides between an extended position (see FIG. 1) and a retracted position (see FIG. 5). In the extended position, the generally planar surface 106 is generally rigid and adapted to support the pan (not shown) having melted adhesive drained therein. In the retracted position, the shelf 104 inserts into the support structure 38 and is generally flush with the front panel 48.

Figure 5:
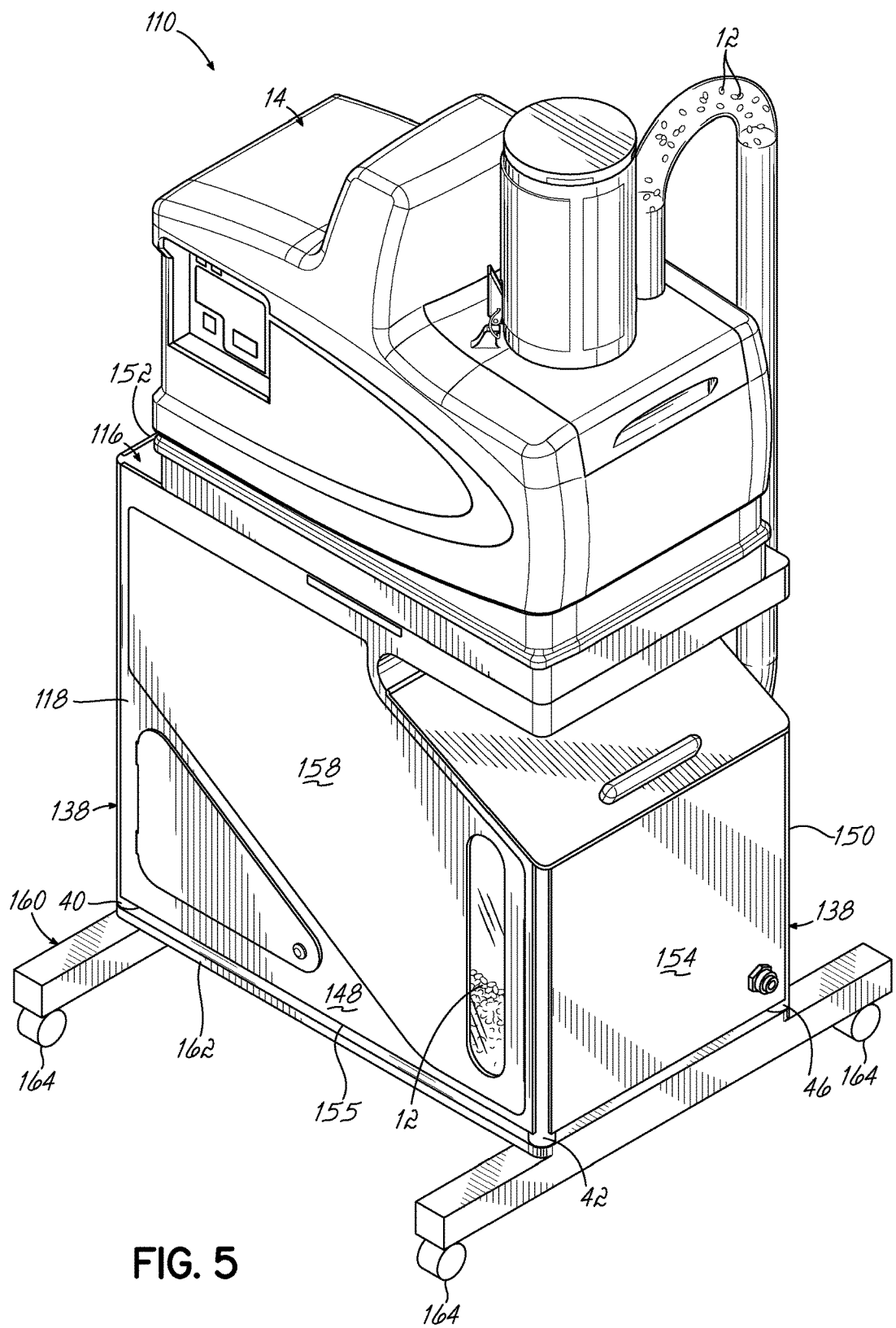
FIG. 5 is a perspective view of another embodiment of a dispensing system.

FIG. 5 shows another embodiment of an adhesive dispensing system 110. Accordingly, like features between these embodiments are described with like numbers. A pedestal 116 is thus adapted to support the adhesive melter 14 with a hopper 118 contained therein. Rather than the hopper 18 being connected to the support structure 38 as shown in FIG. 4, FIG. 5 shows the hopper 118 being defined by a support structure 138. The support structure 138 includes the first and second front frames 40, 42, the first rear frame 44, and the second rear frame 46 shown in FIG. 3. The support structure 138 also includes a front panel 148 connected to and extending between the first and second front frames 40, 42 and, similarly, a rear panel 150 connected to and extending between the first and second rear frames 44, 46. A side panel 152 extends between the first front frame 40 and the first rear frame 44, and a lower panel 154 extends between the second front frame 42 and the second rear frame 46. In addition, a bottom panel 155 is connected to each of the first and second front frames 40, 42 and extends to the first and second rear frames 44, 46.

The front, rear, side, lower, and bottom panels 148, 150, 152, 154, 155 are each attached together to form the hopper 118 having the opening 58 (see FIG. 1) for receiving adhesive pellets 12. In addition, the front panel 148 includes an access panel 158 removably attached thereto. The access panel 158 is removable from the front panel 148 in order to gain access within the hopper 118. For instance, periodic cleaning or maintenance within the hopper 118 is greatly simplified by removing the access panel 158 rather than working through the opening 58 (see FIG. 1).

Furthermore, the first and second front frames 40, 42 and the first and second rear frames 44, 46 are connected to a dolly 160 for support. The dolly 160 includes a dolly frame 162 and four wheels 164. The wheels 164 are connected to the dolly frame 162 and positioned adjacent to the first and second front frames 40, 42 and the first and second rear frames 44, 46, but generally outboard of the hopper 118 for providing stability to the pedestal 116 while rolling the adhesive dispensing system 110 from one position to another. The wheels 164 may also be lockable so that the pedestal 116 is inhibited from unintentional movement created by an externally applied force.

Figure 6:
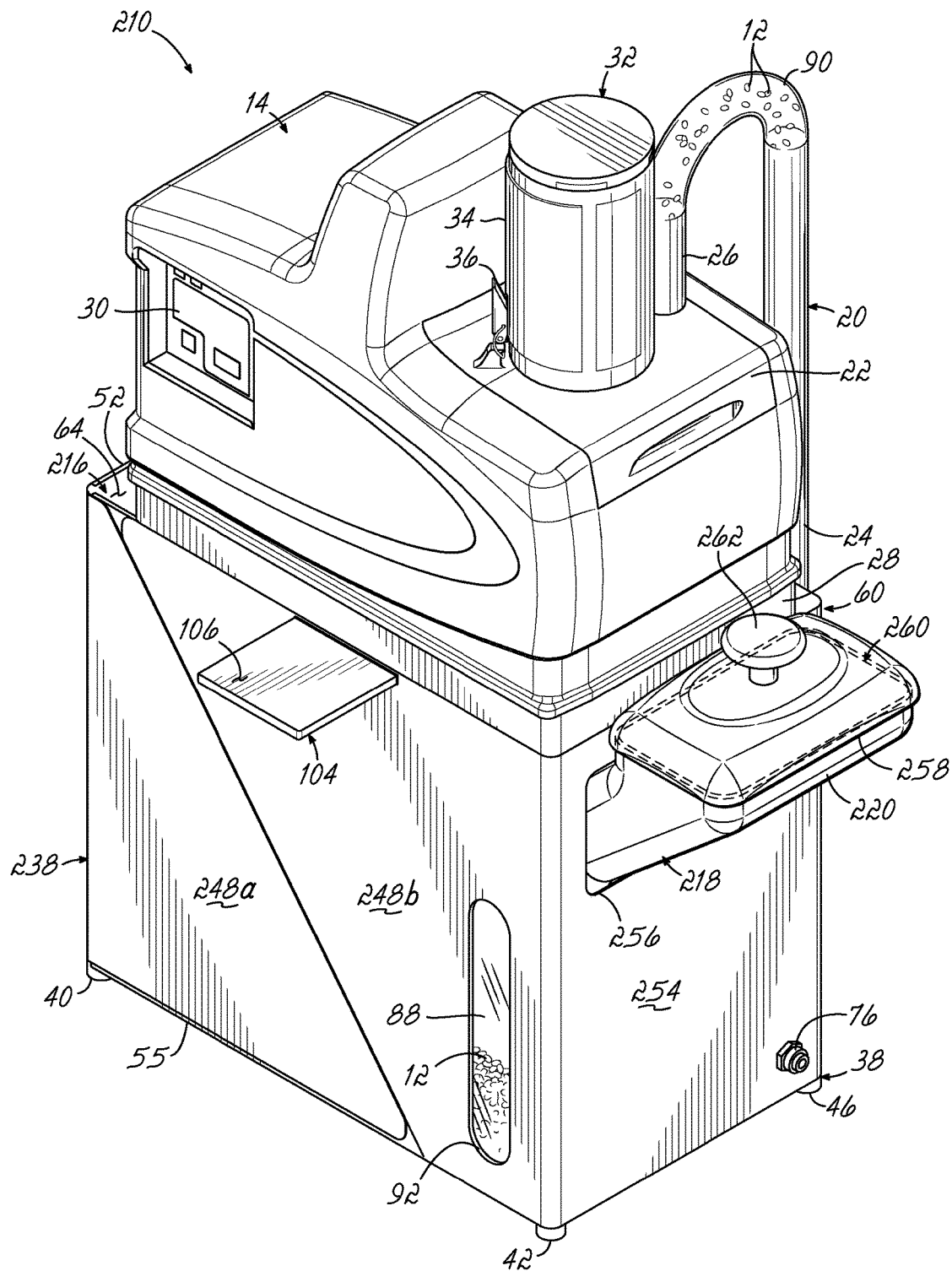
FIG. 6 is a perspective view of yet another embodiment of a dispensing system.

FIG. 6 shows yet another embodiment of an adhesive dispensing system 210. Accordingly, like features between the adhesive dispensing system 210 and the various embodiments are described with like numbers. The adhesive dispensing system 210 includes a pedestal 216. The pedestal 216 has a support structure 238 that includes first and second front frames 40, 42, the first and second rear frames 44, 46, the side panel 52 and rear panel 50 (see FIG. 3). In addition, the support structure 238 includes a first front panel 248a and a second front panel 248b. The first front panel 248a is positioned adjacent to the second front panel 248b such that the first and second front panels 248a, 248b extend between the first and second front frames 40, 42. In this respect, the position of the first and second front panels 248a, 248b is similar to the front panel 48 (see FIG. 1). However, the first front panel 248a is removable from the pedestal 16 to reveal the storage compartment 94 similar to FIG. 3. With respect to FIG. 3 and FIG. 6, the first front panel 248a may be removably attached to the pedestal 216 via clips, fasteners, or latches for accessing the storage compartment 94. According to an exemplary embodiment of the pedestal 216, the storage compartment 94 more particularly contains a transformer assembly for voltage conversion. For example, some industrial environments are wired with a 480V power supply. However, the adhesive melter 14 may operate on a 240V power supply. As such, the storage compartment 94 contains the transformer assembly for converting the 480V power supply to the 240V power supply and powering the adhesive melter 14.

As shown in FIG. 6, the support structure 238 also includes an alternative hopper 218 and face panel 254. More particularly, the face panel 254 includes a hole 256 and extends between the second front frame 42 and the second rear frame 46. The hopper 218 includes a hollow hopper projection 220 that extends through the hole 256 and outward from the remainder of the support structure 238. The hopper projection 220 includes an opening 258. According to an exemplary embodiment, the opening 258 is in a generally horizontal orientation for receiving adhesive pellets dropped generally vertically into the hopper 218. Furthermore, the opening 258 is removably covered by a hopper lid 260 that generally extends over and above the opening 258. Thus, if any foreign matter is directed toward the opening 258 from above, such as falling water, the foreign matter will be deflected by the hopper lid 260 away from the opening 258. Of course, the hopper lid 260 has a lid handle 262 for easily lifting the hopper lid 260 from the opening 258 in order to expose the opening 258. The exposed opening 258 into the hopper 218 may be any appropriate shape and/or size for receiving and containing adhesive pellets 12. As such, the opening 258 extends into the hopper 218 for filling and refilling the hopper 218 with adhesive pellets 12 as necessary for use.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be from such details without departing from the scope or spirit of the general inventive concept.

What is claimed is:

1. A method of supplying adhesive particulates from a hopper to an adhesive melter, the method comprising:
   providing a pedestal including a support structure supporting said adhesive melter and the hopper;
   providing said adhesive melter and said hopper, the hopper being adjacent to and contacting said adhesive melter;
   fluidly coupling a flow tube between the adhesive melter and the hopper, wherein said flow tube includes a first end portion and a second end portion, wherein said first end portion is fluidly coupled to an outlet of said hopper and said second end portion is fluidly coupled to an inlet of said adhesive melter;
   supplying forced air through the flow tube to move the adhesive particulates from the hopper into the adhesive melter; and
   after moving the adhesive particulates from the hopper and the flow tube into the adhesive melter, melting the adhesive particulates into a fluid adhesive.

2. The method of claim 1, wherein providing said adhesive melter and said hopper comprises supporting the adhesive melter generally above the hopper.

3. The method of claim 2, wherein providing said adhesive melter and said hopper comprises supporting the hopper within the support structure generally below the pedestal.

4. The method of claim 1, wherein supplying the forced air through the flow tube to move the adhesive particulates from the hopper into the adhesive melter comprises pumping ambient air through the flow tube to move the adhesive particulates from the hopper into the adhesive melter.

5. A method of supplying adhesive particulates from a hopper to an adhesive melter, the method comprising:
providing a pedestal including a support structure supporting said adhesive melter and the hopper;
providing said adhesive melter and said hopper, the hopper being adjacent to and contacting said adhesive melter;
fluidly coupling a flow tube between the adhesive melter and the hopper, wherein said flow tube includes a first end portion and a second end portion, wherein said first end portion is fluidly coupled to an outlet of said hopper and said second end portion is fluidly coupled to an inlet of said adhesive melter;
operating a venturi pump to pump ambient air through the flow tube to move the adhesive particulates from the hopper into the adhesive melter; and
melting the adhesive particulates in the adhesive melter into a fluid adhesive.

6. The method of claim 1, wherein supplying the forced air through the flow tube to move the adhesive particulates from the hopper into the adhesive melter comprises supplying pressurized gas through the flow tube to move the adhesive particulates from the hopper into the adhesive melter.

7. The method of claim 1, wherein the hopper includes a generally transparent window through which the adhesive particulates stored within the hopper are visible.

8. The method of claim 1, wherein the flow tube includes a generally transparent portion through which the adhesive particulates moving within the flow tube are visible.

9. The method of claim 1, further comprising:
moving a cover of the hopper to an open position to open the hopper; and
refilling the hopper with additional adhesive particulates.

10. The method of claim 9, wherein the cover of the hopper is outside of the support structure supporting the adhesive melter.

11. A method of supplying adhesive particulates from a hopper to an adhesive melter, the method comprising:
providing a pedestal including a support structure supporting said adhesive melter and the hopper;
providing said adhesive melter and said hopper, the hopper being adjacent to and contacting said adhesive melter;
fluidly coupling a flow tube between the adhesive melter and the hopper, wherein said flow tube includes a first end portion and a second end portion, wherein said first end portion is fluidly coupled to an outlet of said hopper and said second end portion is fluidly coupled to an inlet of said adhesive melter;
suctioning the adhesive particulates from the hopper into the flow tube with a suction wand in fluid communication with the flow tube to move the adhesive particulates from the hopper into the adhesive melter; and
melting the adhesive particulates in the adhesive melter into a fluid adhesive.

12. The method of claim 11, further comprising vibrating the suction wand to loosen the adhesive particulates suctioned from the hopper into the flow tube.

13. The method of claim 1, wherein adhesive particulates are moved from the hopper into a tank of the adhesive melter for melting the adhesive particulates into the fluid adhesive.

14. The method of claim 1, further comprising filtering the supplied forced air that exhausts from the adhesive melter.

15. A method of supplying adhesive particulates from a hopper to an adhesive melter, the method comprising:
providing a pedestal including a support structure supporting said adhesive melter and the hopper;
providing said adhesive melter and said hopper, the hopper being adjacent to and contacting said adhesive melter, the hopper including a generally transparent window, said generally transparent window comprising a major axis and a minor axis, said major axis being longer than said minor axis, said major axis extending vertically along said hopper and traverse to a bottom of said adhesive melter for viewing the level of adhesive particulates contained therein;
fluidly coupling a flow tube between the adhesive melter and the hopper, wherein said flow tube includes a first end portion and a second end portion, wherein said first end portion is fluidly coupled to an outlet of said hopper and said second end portion is fluidly coupled to an inlet of said adhesive melter;
supplying forced air through the flow tube to move the adhesive particulates from the hopper into the adhesive melter; and
melting the adhesive particulates in the adhesive melter into a fluid adhesive.

16. A method of supplying adhesive particulates from a hopper to an adhesive melter, the method comprising:
providing a pedestal including a support structure supporting said adhesive melter and the hopper;
providing said adhesive melter and said hopper, the hopper being adjacent to and contacting said adhesive melter;
fluidly coupling a flow tube between the adhesive melter and the hopper, wherein said flow tube includes a first end portion and a second end portion, wherein said first end portion is fluidly coupled to an outlet of said hopper and said second end portion is fluidly coupled to an inlet of said adhesive melter, said outlet of said hopper being below said pedestal;
supplying forced air through the flow tube to move the adhesive particulates from the hopper into the adhesive melter; and
melting the adhesive particulates in the adhesive melter into a fluid adhesive.

17. A method of supplying adhesive particulates from a hopper to an adhesive melter, the method comprising:
providing a pedestal including a support structure supporting said adhesive melter and the hopper;
providing said adhesive melter and said hopper, the hopper being adjacent to and contacting said adhesive melter;
fluidly coupling a flow tube between the adhesive melter and the hopper, wherein said flow tube includes a first end portion and a second end portion, wherein said first end portion is fluidly coupled to an outlet of said hopper and said second end portion is fluidly coupled to a lid of a tank of said adhesive melter;
supplying forced air through the flow tube to move the adhesive particulates from the hopper into the adhesive melter; and
melting the adhesive particulates in the adhesive melter into a fluid adhesive.

18. The method of claim 1, wherein said hopper includes an inclined bottom portion.

19. The method of claim 1, further comprising directing said adhesive particulates toward said first end portion of said flow tube.

20. The method of claim 1, further comprising supporting said hopper on said support structure.

21. A method of supplying adhesive particulates from a hopper to an adhesive melter, the method comprising:
- providing a pedestal including a support structure supporting said adhesive melter and said hopper, wherein said hopper is supported adjacent to and contacting said adhesive melter;
- fluidly coupling a flow tube between the adhesive melter and the hopper;
- supplying forced air through the flow tube to move the adhesive particulates from the hopper into the adhesive melter; and
- after moving the adhesive particulates from the hopper and the flow tube into the adhesive melter, melting the adhesive particulates into a fluid adhesive.

* * * * *